United States Patent
Terakawa et al.

(10) Patent No.: US 10,803,897 B2
(45) Date of Patent: Oct. 13, 2020

(54) MAGNETIC RECORDING MEDIUM

(71) Applicant: Sony Corporation, Tokyo (JP)

(72) Inventors: Masaru Terakawa, Miyagi (JP); Yoichi Kanemaki, Miyagi (JP); Minoru Yamaga, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/928,684

(22) Filed: Mar. 22, 2018

(65) Prior Publication Data

US 2018/0226093 A1 Aug. 9, 2018

Related U.S. Application Data

(63) Continuation of application No. 14/514,518, filed on Oct. 15, 2014, now abandoned.

(30) Foreign Application Priority Data

Oct. 22, 2013 (JP) .................................. 2013-219182

(51) Int. Cl.
   G11B 5/706 (2006.01)
   G11B 5/70 (2006.01)
(52) U.S. Cl.
   CPC ............ G11B 5/70642 (2013.01); G11B 5/70 (2013.01)
(58) Field of Classification Search
   CPC .............................. G11B 5/70642; G11B 5/70
   See application file for complete search history.

(56) References Cited

U.S. PATENT DOCUMENTS

| | | |
|---|---|---|
| 2005/0008899 A1 | 1/2005 | Tachibana et al. |
| 2005/0045580 A1 | 3/2005 | Baer et al. |
| 2008/0057352 A1 | 3/2008 | Ohkoshi et al. |
| 2009/0174969 A1 | 7/2009 | Tada et al. |
| 2010/0323222 A1 | 12/2010 | Nakashio et al. |
| 2014/0329112 A1 | 11/2014 | Aizawa |
| 2014/0342189 A1 | 11/2014 | Tachibana et al. |
| 2014/0363700 A1 | 12/2014 | Tachibana et al. |
| 2015/0111066 A1 | 4/2015 | Terakawa et al. |

(Continued)

FOREIGN PATENT DOCUMENTS

| | | |
|---|---|---|
| JP | 2005-032360 A | 2/2005 |
| JP | 2005-071537 A | 3/2005 |

(Continued)

OTHER PUBLICATIONS

Japanese Office Action dated Nov. 8, 2016 in connection with Japanese Application No. 2013-219182, and English translation thereof.

(Continued)

*Primary Examiner* — Holly C Rickman
*Assistant Examiner* — Linda N Chau
(74) *Attorney, Agent, or Firm* — Wolf, Greenfield & Sacks, P.C.

(57) ABSTRACT

A magnetic recording medium includes a nonmagnetic support body, and a magnetic layer containing magnetic powder, in which the magnetic powder contains $\varepsilon$:$Fe_2O_3$ crystal (including a case of substituting a portion of Fe site with a metal element M), a product of residual magnetization and a thickness of the magnetic layer is from 0.5 mA to 6.0 mA, and a squareness ratio which is measured in a longitudinal direction of the magnetic layer is 0.3 or less.

20 Claims, 1 Drawing Sheet

(56) References Cited

U.S. PATENT DOCUMENTS

2016/0099018 A1    4/2016   Aizawa
2017/0069343 A1    3/2017   Tachibana et al.

FOREIGN PATENT DOCUMENTS

| JP | 2007-294084 A | 11/2007 |
| JP | 2008-060293 A | 3/2008 |
| JP | 2008-063201 A | 3/2008 |
| WO | WO 2010/150853 A1 | 12/2010 |

OTHER PUBLICATIONS

Japanese Office Action dated Jul. 11, 2017 in connection with Japanese Application No. 2013-219182, and English translation thereof.
U.S. Appl. No. 12/815,678, filed Jun. 15, 2010, Nakashio et al.
U.S. Appl. No. 14/250,097, filed Apr. 10, 2014, Aizawa.
U.S. Appl. No. 14/273,694, filed May 9, 2014, Tachibana et al.
U.S. Appl. No. 14/289,762, filed May 29, 2014, Tachibana et al.
U.S. Appl. No. 14/514,518, filed Oct. 15, 2014, Terakawa et al.
U.S. Appl. No. 14/879,976, filed Oct. 9, 2015, Aizawa.
U.S. Appl. No. 15/208,932, filed Jul. 13, 2016, Tachibana et al.

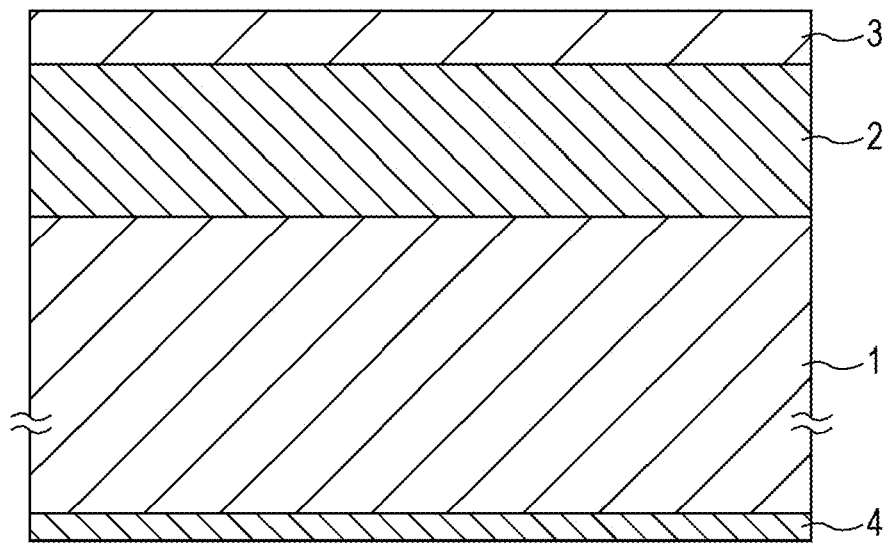

MAGNETIC RECORDING MEDIUM

CROSS REFERENCE TO RELATED APPLICATIONS

This application is a continuation of and claims the benefit under 35 U.S.C. § 120 of U.S. patent application Ser. No. 14/514,518, titled "MAGNETIC RECORDING MEDIUM," filed on Oct. 15, 2014, which claims the benefit of Japanese Priority Patent Application JP 2013-219182 filed Oct. 22, 2013, the entire contents of which are incorporated herein by reference.

BACKGROUND

The present technology relates to a magnetic recording medium. In detail, the present technology relates to a magnetic recording medium that includes a magnetic layer containing magnetic powder.

In the related art, as a magnetic recording medium, an application type magnetic recording medium in which a magnetic layer is formed by applying magnetic paint containing magnetic powder, a binding agent, and an organic solvent on a nonmagnetic support body, and drying the magnetic paint, is known. The application type magnetic recording medium is widely used as a recording medium having high recording density, such as a data cartridge for backup.

In recent years, in order to deal with the recording medium having the high recording density, a magnetic recording reproduction system with high capacity which uses a reproduction head having super high sensitivity such as a high sensitive magnetic resistance effect type magnetic head (MR (magneto resistive) head), is proposed (for example, see Japanese Unexamined Patent Application Publication Ho. 2010-170639).

SUMMARY

In the magnetic recording reproduction system with high capacity which uses the reproduction head having the super high sensitivity described above, a magnetic recording medium that can obtain a high carrier to noise ratio (CNR) is desired.

Therefore, it is desirable to provide a magnetic recording medium that can obtain a high carrier to noise ratio, in a magnetic recording reproduction system with high capacity which uses a reproduction head having super high sensitivity.

According to an embodiment of the present technology, there is provided a magnetic recording medium including a nonmagnetic support body, and a magnetic layer containing magnetic powder, in which the magnetic powder contains $\varepsilon$—$Fe_2O_3$ crystal (including a case of substituting a portion of Fe site with a metal element M), a product of residual magnetization and a thickness of the magnetic layer is from 0.5 mA to 6.0 mA, and a squareness ratio which is measured in a longitudinal direction of the magnetic layer is 0.3 or less.

As described above, according to the present technology, it is possible to obtain the high carrier to noise ratio, in the magnetic recording reproduction system with high capacity which uses the reproduction head having the super high sensitivity.

BRIEF DESCRIPTION OF THE DRAWING

FIGURE is a schematic cross-sectional view illustrating an example of a configuration of a magnetic recording medium according to an embodiment of the present technology.

DETAILED DESCRIPTION OF EMBODIMENTS

Embodiments of the present technology will be described in the following order, while referring to a drawing.
1. Configuration of Magnetic Recording Medium
2. Method for Manufacturing Magnetic Recording Medium 1. Configuration of Magnetic Recording Medium As shown in FIG. 1, a magnetic recording medium according to an embodiment of the present technology, includes a nonmagnetic support body 1, a nonmagnetic layer 2 that is arranged on one main face of the nonmagnetic support body 1, and a magnetic layer 3 that is arranged on the nonmagnetic layer 2. The magnetic recording medium may further include a back coat layer 4 that is arranged on the other main face of the nonmagnetic support body 1, if necessary. The magnetic recording medium according to the embodiment of the present technology is, for example, a perpendicular magnetic recording medium using a magnetic resistance effect type (Tunneling Magneto-Resistance: TMR) head of a tunnel type as a reproduction head of a recording reproduction system.

Nonmagnetic Support Body

For example, the nonmagnetic support body 1 is a film in a long shape having flexibility. As a material of the nonmagnetic support body 1, for example, polyesters such as polyethylene terephthalate, polyolefins such as polyethylene and polypropylene, cellulose derivatives such as cellulose triacetate, cellulose diacetate, and cellulose butyrate, vinyl based resins such as polyvinyl chloride and polyvinylidene chloride, plastic such as polycarbonate, polyimide, and polyamide imide, light metals such as an aluminum alloy and a titanium alloy, and ceramic such as alumina glass, can be used. Furthermore, in order to increase mechanical strength, a case of forming a thin film containing an oxide of Cu or Al on at least one of the main faces of the nonmagnetic support body 1 containing the vinyl based resin or the like, may be used.

Magnetic Layer

The magnetic layer 3 contains, for example, magnetic powder, a binding agent, and conductive particles. The magnetic layer 3 may further contain addition agents such as a lubricant, a polishing agent, and an antirust agent, if necessary.

A product (Mr·t) of residual magnetization and a thickness of the magnetic layer 3, is from 0.5 mA to 6.0 mA, and preferably from 2.0 mA to 4.0 mA. Moreover, a squareness ratio (Mr/Ms) which is measured in a longitudinal direction of the magnetic layer 3, is 0.3 or less, and preferably 0.22 or less. If Mr·t is less than 0.5 mA, a lowering of a media noise domination rate is seen, that is, a significant deterioration of a C/N is caused by quite receiving influence of system noise. On the other hand, if Mr·t exceeds 6.0 mA, collapse of a reproduction waveform begins to be observed, and it becomes unsuitable for a recording reproduction system. In addition, if the squareness ratio (Mr/Ms) which is measured in the longitudinal direction, exceeds 0.3, it is suggested that a magnetic powder orientation degree of a perpendicular direction deteriorates with respect to the nonmagnetic support body 1, and it leads to degradation of the C/N.

An average thickness of the magnetic layer 3 is preferably from 30 nm to 100 nm, and more preferably from 50 nm to 70 nm. If the average thickness of the magnetic layer 3 is less than 30 nm, forming the magnetic layer 3 of a uniform thickness by application, becomes very difficult. On the other hand, if the average thickness of the magnetic layer 3 exceeds 100 nm, an output of a short wavelength region which is necessary as a magnetic recording medium having high density, is degraded due to a reason such as incoherent magnetization reversal.

A coersive force He of the magnetic layer 3 is preferably from 2000 Oe to 4500 Oe, and more preferably from 3500 Oe to 4000 Oe. If the coersive force Hc is less than 2000 Oe, the output of the short wavelength region which is necessary as a magnetic recording medium having the high density, is lowered, and the favorable C/N is not obtained. On the other hand, it the coersive force Hc exceeds 4500 Oe, saturation recording becomes difficult at time of writing a signal, and the favorable C/N is not obtained as a result.

Magnetic Powder

The magnetic powder is made up of particles of an iron oxide which takes $\delta$—$Fe_2O_3$ crystal (including a case of substituting a portion of Fe site with a metal element M) as a main phase. For example, the metal element M is at least one kind that is selected from a group consisting of Al, Ga, and In. However, when a molar ratio of M and Fe in the iron oxide is expressed by M:Fe=x: (2−x), it is 0≤x<1.

In the present technology, unless it is particularly prohibited, the $\varepsilon$—$Fe_2O_3$ crystal contains the crystal in which the portion of the Fe site is substituted with the trivalent metal element M, and a space group is the same as the pure $\varepsilon$—$Fe_2O_3$ crystal (that is, the sapce group is $Pna2_1$), in addition to the pure $\varepsilon$—$Fe_2O_3$ crystal in which the Fe site is not substituted with other elements.

An spontaneous magnetization amount σs of the magnetic powder, is preferably from 5 emu/g to 25 emu/g, and more preferably from 20 emu/g to 25 emu/g. If the spontaneous magnetization amount σs is less than 0.5 emu/g, there is a possibility that the particles showing superparamagnetic behavior by the lowering of magnetic energy are mixed, and moreover, the favorable C/N is not obtained due to an output shortage. On the other hand, if the spontaneous magnetization amount σs exceeds 25 emu/g, output saturation of the reproduction head begins to be observed, and the favorable C/N is not obtained. Additionally, it is necessary to reduce a filling rate or the magnetic powder among the magnetic layer 3 in order to avoid the output saturation, and, as a result, the favorable C/N is not obtained. Physical volume (particle size) of the magnetic powder is preferably from 800 $nm^3$ to 4000 $nm^3$, and more preferably from 1000 $nm^3$ to 1500 $nm^3$. If the particle size is less than 800 $nm^3$, it is extremely difficult to disperse the particles, and the C/N deteriorates. On the other hand, if the particle size exceeds 4000 $nm^3$, the dispersion is easy, but particulate noise increases, and the favorable C/N is not obtained. The filling rate of the magnetic powder is preferably 30% or more, and more preferably from 30% to 50%, and further preferably from 40% to 48.5%. If the filling rate of the magnetic powder is less than 30%, the noise increases, and the favorable C/N is not obtained.

Binding Agent

As a binding agent, the resin of a structure in which a cross linking reaction is granted to a polyurethane based resin, a vinyl chloride based resin, or the like, is preferable. However, the binding agent is not limited thereto, and the binding agent may be made by appropriately mixing other resins, depending on physical properties or the like which is asked with respect to the magnetic recording medium. Commonly, as the mixed resin, it is not particularly limited, if the resin is generally used in an application type magnetic recording medium.

For example, vinyl chloride, vinyl, acetate, vinyl chloride-vinyl acetate copolymer, vinyl chloride-vinylidene chloride copolymer, vinyl chloride-acrylonitrile copolymer, acrylic acid ester-acrylonitrile copolymer, acrylic acid ester-vinyl chloride-vinylidene chloride copolymer, vinyl chloride-acrylonitrile copolymer, acrylic acid ester-acrylonitrile copolymer, acrylic acid ester-vinylidene chloride copolymer, methacrylic acid ester-vinylidene chloride copolymer, methacrylic acid ester-vinyl chloride copolymer, methacrylic acid ester-ethylene copolymer, polyvinyl fluoride, vinylidene chloride-acrylonitrile copolymer, acrylonitrile-butadiene copolymer, a polyamide resin, polyvinyl butyral, cellulose derivatives (cellulose acetate butyrate, cellulose diacetate, cellulose triacetate, cellulose propionate, and nitrocellulose), styrene-butadiene copolymer, a polyester resin, a amino resin, synthetic rubber or the like, is exemplified.

Moreover, as an examples of a thermosetting resin or a reactive type resin, a phenol resin, an epoxy resin, a urea resin, a melamine resin, an alkyd resin, a silicone resin, a polyamine resin, a urea formaldehyde resin or the like, is exemplified.

In addition, in each binding agent described above, for a purpose of improving dispersibility of the magnetic powder, polar functional groups such as —$SO_3M$, —$OSO_3M$, —COOM, and P=$O(OM)_2$, may be introduced. Here, M in expressions is a hydrogen atom, or alkali metals such as lithium, potassium, and sodium.

Furthermore, as a polar functional group, a side chain type having terminal groups of —NR1R2, and —NR1R2R3+X—, and a main chain type of >NR1R2+X—, are exemplified. Here, R1, R2, and R3 in the expressions are the hydrogen atoms or a hydrocarbon group, and X— is halogen atom ions such as fluorine, chlorine, bromine, and iodine, or an inorganic ion, or an organic ion. Moreover, as a polar functional group, —OH, —SH, —CN, an epoxy group or the like, is exemplified.

Conductive Particle

As a conductive particle, a minute particle containing carbon as a main component, for example, carbon black can be used. As the carbon black, for example, Asahi #15, #15HS or the like of Asahi Carbon Co., Ltd., can be used. Moreover, hybrid carbon in which the carbon is attached on a surface of a silica particle, may be used.

Nonmagnetic Reinforcement Particle

The magnetic layer 3 may further contain an aluminum oxide (α, β, and γ), a chromium oxide, a silicon oxide, diamond, garnet, emery, boron nitride, titanium carbide, silicon carbide, titanium carbide, an titanium oxide (rutile, and anatase) or the like, as a nonmagnetic reinforcement particle.

Nonmagnetic Layer

The nonmagnetic layer 2 contains nonmagnetic powder and the binding agent, as a main component. The nonmagnetic layer 2 may further contain various kinds of the addition agents such as one conductive particles and the lubricant, if necessary.

Nonmagnetic Powder

As the nonmagnetic powder, it is possible to appropriately use the minute particles having the shapes of various kinds such as a needle shape, a spherical shape, and a plate shape.

Binding Agent

As a binding agent, it is possible to use any one of the resins which are applicable into the magnetic layer 3 described above. In addition, in the nonmagnetic layer 2, polyisocyanate is combined with the resin, and it may be cross linking cured. As the polyisocyanate, for example, toluene diisocyanate, and adduct thereof, alkylene diisocyanate, an adduct thereof, and the like, are exemplified.

Conductive Particle

As a conductive particle of the nonmagnetic layer 2, in the same manner as the conductive particle of the magnetic layer 3 described above, for example, it is possible to use the carbon black, the hybrid carbon in which the carbon is attached on the surface of the silica particle, or the like.

Lubricant

As a lubricant which is contained in the magnetic layer 3 and the nonmagnetic layer 2, for example, it is possible to appropriately use ester of monobasic fatty acid having 10 to 24 carbon atoms, and any one of monovalent to hexavalent alcohol having 2 to 12 carbon atoms, mixed ester thereof, di-fatty acid ester, or tri-fatty acid ester. As a specific example of the lubricant, lauric acid, myristic acid, palmitic acid, stearic acid, behenic acid, oleic acid, linoleic acid, linolenic acid, elaidic acid, butyl stearic acid, pentyl stearic acid, heptyl stearic acid, octyl stearic acid, isooctyl stearic acid, octyl myristic acid, or the like, is exemplified.

2. Method for Manufacturing Magnetic Recording Medium

Next, an example of a method for manufacturing a magnetic recording medium having the configuration described above, will be described.

First, by kneading and dispersing the nonmagnetic powder, the conductive particles, the binding agent, and the like, in a solvent, a paint for nonmagnetic layer formation, is prepared. Next, by kneading and dispersing the magnetic powder, the conductive particles, the binding agent, and the like, in the solvent, a paint for magnetic layer formation is prepared. In the preparation of the paint for magnetic layer formation and the paint for nonmagnetic layer formation, the similar solvent, a similar dispersion apparatus, and a similar kneading apparatus, can be applied.

As a solvent which is used in the paint preparation described above, for example, ketone based solvents such as acetone, methyl ethyl ketone, methyl, isobutyl ketone, and cyclohexanone, alcohol based solvents such as methanol, ethanol, and propanol, ester based solvents such as methyl acetate, ethyl acetate, butyl acetate, propyl acetate, ethyl lactate, and ethylene glycol acetate, ether based solvents such as diethylene glycol dimethyl ether, 2-ethoxy ethanol, tetrahydrofuxan, and dioxane, aromatic hydrocarbon based solvents such as benzene, toluene, and xylene, halogenated hydrocarbon based solvents such as methylene chloride, ethylene chloride, carbon tetrachloride, chloroform, and chlorobenzene, or the like, is exemplified. The solvents may be used alone, and may be used by appropriately mixing them.

As a kneading apparatus which is used in the paint preparation described above, for example, the kneading apparatuses such as a consecutive twin screw kneading machine, the consecutive twin screw kneading machine which can dilute in multistage, a kneader, a pressurization kneader, and a roll kneader, can be used, but it is not limited to the apparatuses in particular. Moreover, as a dispersion apparatus which is used in the paint preparation described above, for example, the dispersion apparatuses such as a roll mill, a ball mill, a horizontal type sand mill, a vertical type sand mill, a spike mill, a pin mill, a tower mill, DCP, a homogenizer, and a ultrasonic dispersing machine, can be used, but it is not limited to the apparatuses in particular.

Next, by applying the paint for nonmagnetic layer formation on one main face of the nonmagnetic support body 1, and drying the paint, the nonmagnetic layer 2 is formed. Then, by applying the paint for magnetic layer formation on the nonmagnetic layer 2, and drying the paint, the magnetic layer 3 is formed on the nonmagnetic layer 2. Next, by applying a paint fox back coat layer formation on the other main face of the nonmagnetic support body 1, and drying the paint, the back coat layer 4 is formed.

Subsequently, the nonmagnetic support body 1 on which the nonmagnetic layer 2, the magnetic layer 3, and the back coat layer 4 are formed, is rewound to a large diameter core, and a curing treatment is performed thereon. Next, after a calender treatment is performed with respect to the nonmagnetic support body 1 on which the nonmagnetic layer 2, the magnetic layer 3, and the back coat layer 4 are formed, the treated nonmagnetic support body 1 is cut by a predetermined width. In this way, it is possible to obtain a pancake which is cut by the predetermined width. Furthermore, a process of forming the back coat layer 4 may be performed after the calender treatment.

The process of forming the nonmagnetic layer 2 and the magnetic layer 3, is not limited to the examples described above. For example, a paint film is formed by applying the paint for nonmagnetic layer formation on one main face of the nonmagnetic support body 1, and the paint film is formed by applying the paint for magnetic layer formation once again on the paint film in the wetting state. Thereafter, by drying both paint films, the nonmagnetic layer 2 and the magnetic layer 3 may be formed on one main face of the nonmagnetic support body 1.

EXAMPLES

Hereinafter, the present technology will be specifically described by Examples, but the present technology is not limited only to Examples described herein.

Spontaneous Magnetization Amount σs, and Coersive Force Hc

The spontaneous magnetization amount σs and the coersive force Hc of the magnetic layer, are gained as follows. First, using a vibrating sample magnetometer (VSM), an M-H loop of the magnetic powder is obtained. Next, from the obtained M-H loop, the spontaneous magnetization amount as and the coersive force Hc are gained.

Physical Volume

The physical volume (average particle size) of the ε—$Fe_2O_3$ crystal magnetic powder is gained as follows. First, using a transmission type electron microscope (TEM: Transmission Electron Microscope), the magnetic powder is photographed. Next, 500 particles are randomly picked out from the photographed TEM picture, and particle diameters of the particles are measured, respectively. Here, the particle diameter means the maximum distance across length of the particle (that is, maximum particle diameter). Then, the measured, particle diameters of the 500 particles are simply averaged (arithmetically averaged), and an average particle diameter R is gained. Next, the shape of the particles is considered as a spherical shape, and a physical volume V is gained from the following expression, using the average particle diameter R which is gained as described above.

$$V=(4\pi(R/2)^3/3) \; [nm^3]$$

Filling Rate

The filling rate of the magnetic layer is gained as follows. First, a saturation magnetization amount $M_P$ (emu/cm$^3$) in the case of containing only the magnetic particles in the magnetic layer, is calculated ($M_P=S \times \sigma s$ (emu/cm$^3$)) by the product of a specific gravity S (g/cm$^3$) of the magnetic particle and the spontaneous magnetization amount σs (emu/g). Next, a magnetic tape is cut by a fixed area at an arbitrary position, and a saturation magnetization amount $m_{tape}$ (emu) of the sample, is measured using the VSM (Vibrating Sample Magnetometer). A measurement direction is the longitudinal direction of the magnetic tape. At this time, an applied magnetic field where the saturation magnetization amount $m_{tape}$ is measured, is made as a magnetic field where the measurement sample is magnetically saturated enough, and a region where an MH curve line is saturated, is made as an approximately straight line, and thereby, background noise factors other than the magnetic layer such as the nonmagnetic layer and the support body, are corrected. Moreover, in the method which is described hereinafter, the average thickness of the magnetic layer of the measurement sample, is measured. From values of the average thickness of the magnetic layer, a sample area where the saturation magnetization amount $m_{tape}$ is measured, and the saturation magnetization amount $m_{tape}$, a saturation magnetization amount $M_{tape}$ (emu/cm$^3$) is calculated. The filling rate is gained by the following expression, using $M_P$ and $M_{tape}$ which are gained as described above.

Filling rate (%)=($M_{tape}/M_P$)×100 Mr·t

The magnetic tape that is rolled round a reel, is cut by the fired area at arbitrary position, and the MH curve line is measured in the longitudinal direction of the magnetic tape. The measurement magnetic field is the magnetic field where the MH curve line of the magnetic tape is saturated enough. Since the obtained MH curve line includes the background noise other than the magnetic layer such as the nonmagnetic layer and the support body, the region where the MH curve line is saturated, is made as the approximately straight line, and a deduction is performed from the MH curve line, and thereby, it is possible to obtain the MH curve line of only the magnetic layer. By averaging an absolute value of the magnetization amount (emu) in the magnetic field 0 Oe of the obtained MH curve line, a residual magnetization amount Mr (emu) is calculated. Mr·t (mA) is calculated, from the obtained residual magnetization amount Mr (emu) and the size of the measurement sample.

Mr/Ms

In the MH curve line which is measured as described above, a magnetization amount Ms of the portion where the magnetization amount suspending the magnetic field is saturated enough, is calculated. The squareness ratio Mr/Ms of the MH curve line is calculated, by dividing Mr (emu) which is gained as described above, by Ms (emu).

Average Thicknesses of Nonmagnetic layer, and Magnetic Layer

The average thicknesses of the nonmagnetic layer, and the magnetic layer, are gained as follows. First, the magnetic tape is perpendicularly cut out with respect to the main face thereof, and a cross section thereof is photographed by the TEM, at 60,000 times. Next, 10 points are randomly picked out from the photographed TEM picture, and the thicknesses of the nonmagnetic layer, and the magnetic layer at each of the points, are measured. Then, measurement values thereof are simply averaged (arithmetically averaged), respectively, and the average thicknesses of the nonmagnetic layer, and the magnetic layer, are gained.

Examples 1 to 16

A first composition of a mixture described below, is kneaded with an extruder. Thereafter, premixing is performed, by adding a second composition of the mixture described below to line first composition, with a stirring tank including a disperses. Thereafter, the paint for magnetic layer formation is prepared, by further performing sand mill mixing, and performing a filter treatment.

First Composition

ε—Fe$_2$O$_3$ crystal magnetic powder; 100 parts by weight (as shown in Table 1, in a range of the spontaneous magnetization amount as σs=5 emu/g to 25 emu/g, the physical volume=800 nm$^3$ to 400 nm$^3$, the filling rate=30% or more, and the coersive force Hc=2000 Oe to 4500 Oe) vinyl chloride based resin (cyclohexanone solution 30 wt %): 55.6 parts by weight (containing a polymerization degree 300, Mn=10000, SO$_3$K=0.07 mmol/g as a polar functional group, and class 2 OH=0.3 mmol/g)

aluminum oxide powder: 5 parts by weight (α—Al$_2$O$_3$, average particle diameter: 0.2 μm)

carbon black: 2 parts by weight (manufactured by Tokai Carbon Co., Ltd., trade name: SEAST TA)

Second Composition vinyl chloride based resin: 27.8 parts by weight (resin solution: resin content 30 wt %, cyclohexanone 70 wt %)

n-butyl stearate: 2 parts by weight methyl ethyl ketone: 121.3 parts by weight toluene: 121.3 parts by weight cyclohexanone: 60.7 parts by weight Next, a third composition of the mixture described below, is kneaded with the extruder. Thereafter, the premixing is performed, by adding a fourth composition of the mixture described below to the third composition, with the stirring tank including the dispenser. Thereafter, the paint for nonmagnetic layer formation is prepared, by further performing the sand mill mixing, and performing the filter treatment.

Third Composition iron oxide powder having the needle shape: 100 parts by weight, (α—Fe$_2$O$_3$, average major axis length 0.15 μm)

vinyl chloride based resin: 55.6 parts by weight (resin solution: resin content 30 wt %, cyclohexanone 70 wt %)

carbon black: 10 parts by weight (average particle diameter: 20 nm)

Fourth Composition polyurethane based resin UR8200 (manufactured by Toyobo Co., Ltd.): 18.5 parts by weight n-butyl stearate: 2 parts by weight methyl ethyl ketone: 108.2 parts by weight toluene: 108.2 parts by weight cyclohexanone: 18.5 parts by weight Next, as a curing agent, polyisoeyanate (trade name: CORONATE L, manufactured by Nippon Polyurethane Industry Co., Ltd.) of 4 parts by weight, and myristic acid of 2 parts by weight, are added to each of the paint for magnetic layer formation, and the paint for nonmagnetic layer formation which are prepared as described above.

Subsequently, using the paints, on a polyethylene naphthalate film (PEN film) which is the nonmagnetic support body, the nonmagnetic layer, and the magnetic layer are formed as follows. First, on the PEN film having the thickness of 6.2 μm which is the nonmagnetic support body, the paint for nonmagnetic layer formation is applied, and dried, and thereby, the nonmagnetic layer is formed on the PEN film. Next, on the nonmagnetic layer, the paint for magnetic layer formation is applied, and dried, and thereby, the magnetic layer is formed on the nonmagnetic layer. Then, the calender treatment is performed with respect to the PEN film on which the nonmagnetic layer, and the magnetic layer are formed, and the surface of the magnetic layer is smoothed. Furthermore, the average thickness of the nonmagnetic layer after the calender treatment, is 1100 nm, and the average thickness of the magnetic layer is in the range of 30 nm to 100 nm.

Next, as a back coat layer, on the face of a side opposite to the magnetic layer, the paint of the following composition is applied by a film thickness of 0.6 μm, and a drying treatment thereof is performed.

carbon black (manufactured by Asani Carbon Co., Ltd., trade name: #80): 100 parts by weight
polyester polyurethane: 100 parts by weight (manufactured by Nippon Polyurethane Industry Co., Ltd., trade name: N-2304)
methyl ethyl ketone: 500 parts by weight
toluene: 400 parts by weight
cyclohexanone: 100 parts by weight Subsequently, the PEN film on which the nonmagnetic layer, the magnetic layer, and the back coat layer are formed as described above, is cut by ½ inch (12.65 mm) width, and the magnetic tape is obtained.

Comparative Examples 1 to 6, 8 to 14

As the ε—Fe$_2$O$_3$ crystal magnetic powder which is contained in the first composition of the paint for the magnetic layer formation, the ε—Fe$_2$O$_3$ crystal magnetic powder having the spontaneous magnetization amount σs, the physical volume, the filling rate, and the coersive force Hc which are shown in Table 2, is used. Moreover, the average thickness of the magnetic layer is set to the thickness which is shown in Table 2. Except for this, the magnetic tape is obtained, in the same manner as Examples 1 to 16.

Comparative Examples 7 and 15

Instead of the ε—Fe$_2$O$_3$ crystal magnetic powder which is contained in the first composition of the paint for the magnetic layer formation, barium ferrite (BaFe$_{12}$O$_{19}$) magnetic powder having the spontaneous magnetization amount σs, the physical volume, the filling rate, and the coersive force Hc which are shown in Table 2, is used. Additionally, the average thickness of the magnetic layer is set to the thickness which is shown in Table 2. Except for this, the magnetic tape is obtained, in the same manner as Examples 1 to 16.

Using a loop tester manufactured by Micro Physics, Inc., in the measurement of the following properties of various kinds, the measurement of electromagnetic conversion properties is performed at tape speed of 2 m/sec.

Media Noise Domination Rate

A media noise domination rate is calculated using the following method. The measurement of each noise spectrum of reproduction noise (total noise) N$_{total}$ and system noise N$_{system}$ that are obtained by reproducing the magnetic tape which is AC demagnetized, with the reproduction head, is performed using a spectrum analyzer. Quantification of each noise is performed, using an integrated value of a frequency of 0 MHz to 20 MHz, and a media noise N$_{media}$, and the media noise domination rate are gained, using the noise value thereof, in accordance with the following expression.

$$N_{media} = \sqrt{((N_{total})^2 - (N_{system})^2)}$$

Media noise domination rate = $(N_{media}/N_{total}) \times 100 [\%]$

The ratio of the media noise with respect to the total noise, is defined as a media noise domination rate.

Head Output Saturation

The waveform observation of the (isolation) reproduction waveform at the time of performing the recording reproduction at a recording frequency of 0.5 MHz (recording wave length 4 μm), is performed on an oscilloscope, and, a magnetic saturation state of the reproduction head due to leakage flux from the tape, is guessed, by the collapse degree of the waveform in the vicinity of a waveform peak. In the table, the case of observing the collapse of the waveform is expressed by "x", and the case of observing no collapse of the waveform is expressed by "O". The output saturation, that is, the case of observing the collapse of the reproduction waveform, means that the output which have to be obtained originally, is not obtained, and when considered in one recording reproduction system, it is considered than using the recording medium is not suitable, and moreover, the collapse of the waveform deteriorates, and it can be a noise occurrence cause.

Output Fluctuation

By setting the recording frequency at 10 MHz (recording wave length 0.2 μm), the recording reproduction is performed at an optimum recording current, and a fluctuation amount of the reproduction output is measured using a digital oscilloscope manufactured by Lecroy Company. The output fluctuation amount is defined as follows.

Output fluctuation amount = $(\sigma/TAA) \times 100 [\%]$

Here, TAA is Track Averaged Amplitude (track average output), and σ uses the standard deviation thereof.

In the table, the sample whose the output fluctuation amount is 10% or less, is expressed by "O", and the sample whose the output fluctuation amount exceeds 10%, is expressed by "x". The output fluctuation increases, and it is suggested that variation in the thickness of the magnetic layer increases, or that dropout in which the reproduction waveform is missed, occurs. Among these, for example, since the deterioration of a bit error rate is seen even when the favorable C/N is locally obtained, the sample whose the output fluctuation amount exceeds 10%, is not suitable as a magnetic recording medium having high density.

C/N

By setting the recording frequency at 10 MHz (recording wave length 0.2 μm), the recording reproduction is performed at the optimum recording current, and the reproduction output value of 10 MHz, and the average value of the noise of 10 MHz±1 MHz, are measured using the spectrum analyzer. A difference therebetween, is defined as C/N. In the table, C/N of Comparative Example 15 is set to 0 dB, and it is expressed by a relative difference therebetween.

Table 1 shows the configurations and evaluation results of the magnetic tapes of Examples 1 to 16.

TABLE 1

| | Magnetic Powder | σS [emu/G] | Physical Volume [nm³] | Magnetic Layer Thickness [nm] | Magnetic Powder Filling Rate(%) | Mrt [mA] | Coersive force [Oe] | Mr/Ms (Longitudinal Measurement) | Reproduction Head | Media Nose Domination Rate [%] | Head Output Saturation | Output Fluctuation | C/N [dB] |
|---|---|---|---|---|---|---|---|---|---|---|---|---|---|
| Example 1 | ε-Fe$_2$O$_3$ | 18 | 2500 | 80 | 40.60 | 2.5 | 2900 | 0.21 | TMR | 88 | ○ | ○ | 9 |
| Example 2 | ε-Fe$_2$O$_3$ | 18 | 4000 | 80 | 40.60 | 2.5 | 2900 | 0.21 | TMR | 87 | ○ | ○ | 7.2 |
| Example 3 | ε-Fe$_2$O$_3$ | 18 | 2500 | 30 | 39.50 | 0.9 | 2900 | 0.22 | TMR | 73 | ○ | ○ | 7.5 |
| Example 4 | ε-Fe$_2$O$_3$ | 25 | 2400 | 95 | 49.90 | 6 | 2900 | 0.2 | TMR | 92 | ○ | ○ | 8.2 |
| Example 5 | ε-Fe$_2$O$_3$ | 25 | 2600 | 100 | 45.80 | 5 | 2800 | 0.19 | TMR | 89 | ○ | ○ | 7.8 |
| Example 6 | ε-Fe$_2$O$_3$ | 20 | 2500 | 61 | 30.10 | 1.5 | 2750 | 0.25 | TM R | 78 | ○ | ○ | 6.5 |
| Example 7 | ε-Fe$_2$O$_3$ | 18 | 2500 | 80 | 40.60 | 2.3 | 2900 | 0.28 | TMR | 87 | ○ | ○ | 8 |
| Example 8 | ε-Fe$_2$O$_3$ | 18 | 2500 | 75 | 40.60 | 2.1 | 2900 | 0.3 | TMR | 87 | ○ | ○ | 7.7 |
| Example 9 | ε-Fe$_2$O$_3$ | 18 | 800 | 60 | 40.50 | 2.2 | 2200 | 0.28 | TMR | 85 | ○ | ○ | 7 |
| Example 10 | ε-Fe$_2$O$_3$ | 5 | 2300 | 80 | 36.40 | 0.6 | 2900 | 0.22 | TMR | 71 | ○ | ○ | 7 |
| Example 11 | ε-Fe$_2$O$_3$ | 6 | 2800 | 65 | 33.00 | 0.5 | 2750 | 0.29 | TMR | 71 | ○ | ○ | 6.8 |
| Example 12 | ε-Fe$_2$O$_3$ | 22 | 2400 | 96 | 39.40 | 3.5 | 2860 | 0.22 | TMR | 70 | ○ | ○ | 7.8 |
| Example 13 | ε-Fe$_2$O$_3$ | 14 | 2340 | 85 | 43.30 | 2.1 | 4490 | 0.25 | TMR | 85 | ○ | ○ | 7.6 |
| Example 14 | ε-Fe$_2$O$_3$ | 22 | 2400 | 41 | 39.40 | 1.5 | 2850 | 0.22 | TMR | 83 | ○ | ○ | 7.4 |
| Example 15 | ε-Fe$_2$O$_3$ | 18 | 2500 | 100 | 39.70 | 3.5 | 2030 | 0.22 | TMR | 89 | ○ | ○ | 6.5 |
| Example 16 | ε-Fe$_2$O$_3$ | 22 | 1300 | 65 | 48.00 | 3 | 3800 | 0.19 | TMR | 89 | ○ | ○ | 9 |

Table 2 shows the configurations and the evaluation results of the magnetic tapes of Comparative Examples 1 to 15.

TABLE 2

| | Magnetic Powder | σS [emu/G] | Physical Volume [nm³] | Magnetic Layer Thickness [nm] | Magnetic Powder Filling Rate(%) | Mrt [mA] | Coersive force [Oe] | Mr/Ms (Longitudinal Measurement) | Reproduction Head | Media Noise Domination Rate [%] | Head Output Saturation | Output Fluctuation | C/N [dB] |
|---|---|---|---|---|---|---|---|---|---|---|---|---|---|
| Comparative Example 1 | ε-Fe$_2$O$_3$ | 23 | 4080 | 80 | 33.00 | 2.3 | 2600 | 0.28 | TMR | 85 | ○ | ○ | 6 |
| Comparative Example 2 | ε-Fe$_2$O$_3$ | 16 | 3000 | 85 | 37.90 | 2.1 | 1950 | 0.25 | TMR | 86 | ○ | ○ | 5.9 |
| Comparative Example 3 | ε-Fe$_2$O$_3$ | 30 | 2800 | 95 | 49.60 | 6.1 | 2830 | 0.2 | TMR | 100 | x | ○ | 6.5 |
| Comparative Example 4 | ε-Fe$_2$O$_3$ | 21 | 1900 | 28 | 39.40 | 0.9 | 2610 | 0.29 | TMR | 75 | ○ | x | 6.4 |
| Comparative Example 5 | ε-Fe$_2$O$_3$ | 15 | 2000 | 50 | 29.80 | 0.9 | 2530 | 0.26 | TMR | 74 | ○ | ○ | 5.8 |
| Comparative Example 6 | ε-Fe$_2$O$_3$ | 18 | 2500 | 80 | 40.60 | 2.3 | 2900 | 0.28 | GMR | 50 | ○ | ○ | 5.3 |
| Comparative Example 7 | BaFe$_{12}$O$_{19}$ | 40 | 2500 | 50 | 5.92 | 0.5 | 2900 | 0.22 | TMR | 50 | ○ | ○ | 0 |
| Comparative Example 8 | ε-Fe$_2$O$_3$ | 18 | 2620 | 80 | 36.60 | 2 | 2850 | 0.31 | TMR | 86 | ○ | ○ | 6.2 |
| Comparative Example 9 | ε-Fe$_2$O$_3$ | 18 | 700 | 65 | 39.60 | 1.8 | 2000 | 0.29 | TMR | 83 | ○ | ○ | 5.8 |
| Comparative Example 10 | ε-Fe$_2$O$_3$ | 4.5 | 2200 | 75 | 37.20 | 0.5 | 2400 | 0.27 | TMR | 50 | ○ | ○ | 5.9 |
| Comparative Example 11 | ε-Fe$_2$O$_3$ | 6.5 | 2350 | 55 | 32.50 | 0.48 | 2500 | 0.24 | TMR | 65 | ○ | ○ | 6.2 |
| Comparative Example 12 | ε-Fe$_2$O$_3$ | 26 | 2500 | 100 | 29.40 | 3.3 | 2950 | 0.2 | TMR | 85 | ○ | ○ | 5.8 |
| Comparative Example 13 | ε-Fe$_2$O$_3$ | 19 | 2450 | 105 | 41.50 | 3.3 | 2880 | 0.27 | TMR | 83 | ○ | ○ | 5.7 |
| Comparative Example 14 | ε-Fe$_2$O$_3$ | 16 | 3000 | 85 | 37.90 | 2.1 | 4600 | 0.25 | TMR | 79 | ○ | ○ | 5.9 |
| Comparative Example 15 | BaFe$_{12}$O$_{19}$ | 40 | 4500 | 120 | 36.20 | 6.5 | 1900 | 0.32 | TMR | 100 | x | ○ | 0 |

As described above, the embodiments of the present technology are specifically described, but the present technology is not limited to the embodiments described above, and modifications of various kinds are possible based on technical ideas of the present technology.

For example, the configurations, the methods, the processes, the shapes, the materials, and the numerical values which are exemplified in the embodiments described above, are merely examples, and the configurations, the methods, the processes, the shapes, the materials, and the numerical values which are different therefrom, may be used, if necessary.

Moreover, the configurations, the methods, the processes, the shapes, the materials, and the numerical values of the embodiments described above, can be combined with each other, unless departing from the gist of the present technology.

Furthermore, the present technology can also employ the following configurations.

(1) A magnetic recording medium including a nonmagnetic support body, and a magnetic layer containing magnetic powder, in which the magnetic powder contains $\varepsilon$—$Fe_2O_3$ crystal (including a case of substituting a portion of Fe site with a metal element M), a product of residual magnetization and a thickness of the magnetic layer is from 0.5 mA to 6.0 mA, and a squareness ratio which is measured in a longitudinal direction of the magnetic layer is 0.3 or less.

(2) In the magnetic recording medium according to the above (1), the thickness of the magnetic layer is from 30 nm to 100 nm.

(3) In the magnetic recording medium according to the above (1) of (2), an spontaneous magnetization amount of the magnetic powder is from 5 emu/g to 25 emu/g.

(4) In the magnetic recording medium according to any one of the above (1) to (3), coersive force of the magnetic layer is from 2000 Oe to 4500 Oe.

(5) In the magnetic recording medium according to any one of the above (1) to (4), physical volume of the magnetic powder is from 800 $nm^3$ to 4000 $nm^3$.

(6) In the magnetic recording medium according to any one of the above (1) to (5), a filling rate of the magnetic powder is 30% or more.

(7) In the magnetic recording medium according to any one of the above (1) to (6), a magnetic resistance effect type head of a tunnel type is used as a reproduction head.

It should be understood by those skilled in the art that various modifications, combinations, sub-combinations, and alterations may occur depending on design requirements and other factors insofar as they are within the scope of the appended claims or the equivalents thereof.

What is claimed is:

1. A magnetic recording medium comprising:
   a nonmagnetic support body; and
   a magnetic layer comprising magnetic powder and a binding agent,
   wherein the magnetic powder comprises $\varepsilon$-$Fe_2O_3$ crystals,
   wherein the binding agent comprises a crosslinked polymer comprising a polyurethane and/or a polyvinyl chloride,
   wherein a product of residual magnetization measured in the vertical direction and a thickness of the magnetic layer is from 0.5 mA to 6.0 mA,
   wherein a squareness ratio which is measured in a longitudinal direction of the magnetic layer is 0.22 or less, and
   wherein a spontaneous magnetization amount of the magnetic powder is from 5 emu/g to 25 emu/g.

2. The magnetic recording medium according to claim 1, wherein the thickness of the magnetic layer is from 30 nm to 100 nm.

3. The magnetic recording medium according to claim 1, wherein a coercive force of the magnetic layer is from 2000 Oe to 4500 Oe.

4. The magnetic recording medium according to claim 1, wherein a physical volume of the magnetic powder is from 800 $nm^3$ to 4000 $nm^3$.

5. The magnetic recording medium according to claim 1, wherein a filling rate of the magnetic powder is 30% or more.

6. A magnetic recording reproduction system, comprising:
   the magnetic recording medium according to claim 1; and
   a reproduction head, wherein the reproduction head is a tunneling magnetoresistance head.

7. The magnetic recording medium according to claim 1, wherein at least a portion of Fe sites in the $\varepsilon$-$Fe_2O_3$ crystals are substituted with a metal element M.

8. The magnetic recording medium according to claim 7, wherein the metal element M is In.

9. The magnetic recording medium according to claim 1, wherein the magnetic layer comprises one or more nonmagnetic particles comprising $\alpha$-aluminum oxide, $\beta$-aluminum oxide, $\gamma$-aluminum oxide, chromium oxide, silicon oxide, diamond, garnet, emery, boron nitride, titanium carbide, silicon carbide, and/or titanium oxide.

10. The magnetic recording medium according to claim 9, wherein the titanium oxide is rutile titanium oxide or anatase titanium oxide.

11. A magnetic recording medium comprising:
    a nonmagnetic support body; and
    a magnetic layer comprising magnetic powder and a binding agent,
    wherein the magnetic powder comprises $\varepsilon$-$Fe_2O_3$ crystals,
    wherein the binding agent comprises a crosslinked polymer comprising a polyurethane and/or a polyvinyl chloride,
    wherein a product of residual magnetization measured in the vertical direction and a thickness of the magnetic layer is from 0.5 mA to 6.0 mA,
    wherein a squareness ratio which is measured in a longitudinal direction of the magnetic layer is 0.3 or less, and
    wherein a filling rate of the magnetic powder is 30% or more.

12. The magnetic recording medium according to claim 11, wherein the thickness of the magnetic layer is from 30 nm to 100 nm.

13. The magnetic recording medium according to claim 11, wherein a coercive force of the magnetic layer is from 2000 Oe to 4500 Oe.

14. The magnetic recording medium according to claim 11, wherein a physical volume of the magnetic powder is from 800 $nm^3$ to 4000 $nm^3$.

15. A magnetic recording reproduction system, comprising:
    the magnetic recording medium according to claim 11; and
    a reproduction head, wherein the reproduction head is a tunneling magnetoresistance head.

16. The magnetic recording medium according to claim 11, wherein at least a portion of Fe sites in the $\varepsilon$-$Fe_2O_3$ crystals are substituted with a metal element M.

17. The magnetic recording medium according to claim 16, wherein the metal element M is In.

18. The magnetic recording medium according to claim 11, wherein the magnetic layer comprises one or more non-magnetic particles comprising $\alpha$-aluminum oxide, $\beta$-aluminum oxide, $\gamma$-aluminum oxide, chromium oxide, silicon oxide, diamond, garnet, emery, boron nitride, titanium carbide, silicon carbide, and/or titanium oxide.

19. The magnetic recording medium according to claim 18, wherein the titanium oxide is rutile titanium oxide or anatase titanium oxide.

20. The magnetic recording medium according to claim 11, wherein the squareness ratio is 0.22 or less.

* * * * *